FIP8102 XR 2,731,549
SEARCH ROOM
2612C
X 5186T
246/7
328/89
455/75
X33
X33
X33

CROSS REFERENCE

Jan. 17, 1956 A. V. DASBURG 2,731,549

RADIO COMMUNICATION SYSTEM

Filed Aug. 29, 1951 3 Sheets-Sheet 1

INVENTOR.
A.V. DASBURG
BY Neil W. Preston
His ATTORNEY

2731549
OR IN 246/7

RADIO COMMUNICATION SYSTEM

Filed Aug. 29, 1951 3 Sheets-Sheet 2

INVENTOR.
A.V. DASBURG
BY Neil W. Preston,
His ATTORNEY

Jan. 17, 1956 A. V. DASBURG 2,731,549

RADIO COMMUNICATION SYSTEM

Filed Aug. 29, 1951 3 Sheets-Sheet 3

INVENTOR.
A. V. DASBURG
BY Neil W. Preston,
His ATTORNEY

United States Patent Office 2,731,549

Patented Jan. 17, 1956

2,731,549

RADIO COMMUNICATION SYSTEM

Alfred V. Dasburg, Rochester, N. Y., assignor to General Railway Signal Company, Rochester, N. Y.

Application August 29, 1951, Serial No. 244,158

12 Claims. (Cl. 246—7)

Figure 1:
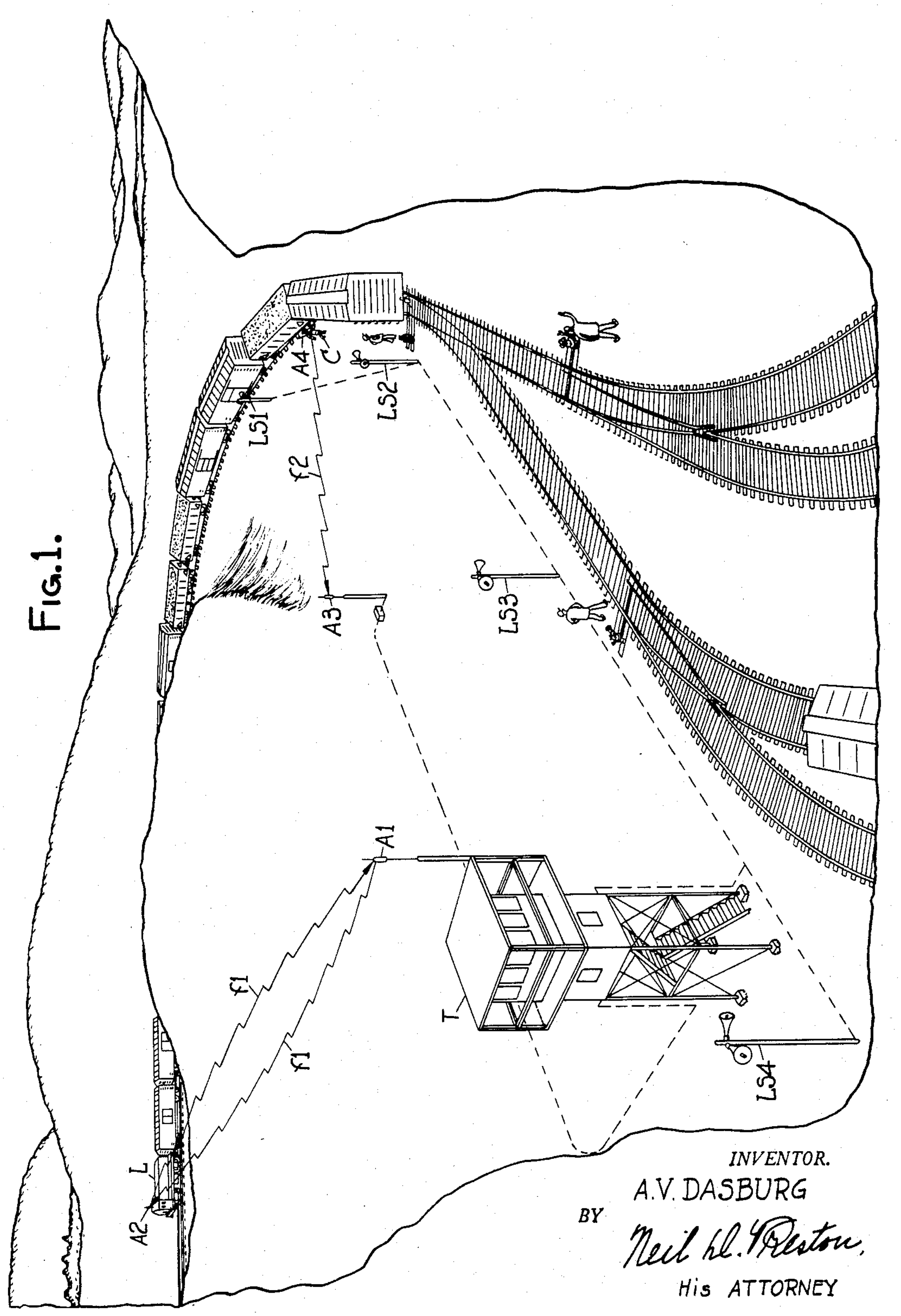

This invention relates to radio communicating systems adapted to provide communication between an operator and one or more moving vehicles, and more particularly relates to a system organized in such a way that the proper operation of the system can be checked.

In connection with systems of communication used to govern train movements on railroads and the like where messages or instructions involve conditions of safety, it is important, and in some cases necessary for safety that the system be organized to provide means for checking its integrity. If the system is thus organized, then the appropriate action may be taken on the part of a trainman in the event of a failure.

Such a situation is found in the usual switching yard on a railroad where the conductor along the trackway issues instructions via radio to a pusher engine for moving cars to be classified in the yard. It is obvious, for example, that if the conductor should give instructions to stop the train and the communication failed, then some dangerous condition might be involved. Thus, it is essential that the engineer on the locomotive be able to determine whenever failure occurs in the communication system in order for him to bring the train to a stop and avoid dangerous conditions. In addition to this positive check on the communication system for the engineer, it is also desirable that the conductor or control operator know when his system of transmission is out of order so as to avoid setting up dangerous conditions of operation.

In some switching yards, it is necessary that switchmen located at strategic points in the yard be advised of the train operation so as to properly position the switches involved in the routing of the train. Thus, it is desirable that the communication system include facilities for supplying such switchmen with information from the conductor or control operator the same as is provided for the engineer. With such an organization, it is desirable that a check be provided so that these switchmen may be advised as to when the communication facilities are inoperative.

With the above general considerations in mind, and without attempting to define the exact nature and scope of the present invention, it is proposed to provide a communication system for a switching yard in which a fixed station or tower includes a radio transmitter and receiver for establishing two-way communication with a radio transmitter and receiver located on the locomotive operating in the switching yard. This two-way communication between the tower and locomotive is effective over a first carrier frequency. The fixed station or tower also includes a receiver operative over another (or second) carrier frequency to receive messages from a portable transmitter carried by the conductor or other trainmen along the trackway. This receiver in the tower is connected to the associated transmitter so that any message received from the conductor over the second frequency is relayed over the first frequency to the locomotive.

In order that the switchmen along the trackway may be advised of the operating instructions, loudspeakers are mounted at strategic points along the trackway with suitable connections to the two receivers at the tower. In this way, the portable transmitter carried by the conductor permits him to communicate both with the locomotive and with the switchmen along the trackway. Also, any message transmitted from the locomotive is heard by the switchmen from the loudspeakers along the track.

It is proposed in accordance with the present invention that the portable transmitter carried by the conductor be so constructed that it normally transmits short pulses of carrier frequency without modulation, which intermittent pulses so act upon the receiving equipment at the tower as to cause so-called "noise tails" or "clicks" to be heard in the loudspeakers along the trackway. Also, the reception of the short pulses of carrier frequency at the tower causes the intermittent rendering effective of the transmitter as such tower so as to likewise produce "noise tails" or "clicks" in the loudspeaker located on the mobile unit or locomotive. Whenever the conductor desires to communicate a message to the locomotive, he actuates a suitable push button to render his portable transmitter continuously effective to place a carrier frequency on the air which carrier frequency may be modulated by his voice message.

With such an organization, the failure to receive a voice message upon the cessation of the intermittent "noise tails" advises the engineer of the locomotive and the switchman along the track that the communication with the conductor has failed. Likewise, since the conductor can hear these "noise tails" in the loudspeakers located along the trackway and can also hear any message that he may transmit in much the same way as the side tone effect in a regular telephone, he can readily determine whether or not his transmitter is effective in the transmission of the instructions that he is giving.

Thus, one of the objects of the present invention may be said to include the provision of a communication system involving a check on its operation both at the sending and receiving ends to avoid the setting up of unsafe conditions in the event of failure.

Another object of the invention is to accomplish the checking operation in a reliable and simple manner without the use of additional apparatus at the fixed and mobile stations.

In addition to the features of general organization, it is proposed to provide in accordance with the present invention a novel and useful radio transmitter having apparatus to normally effect the intermittent transmission of carrier frequency pulses. It is proposed that this transmitting organization be simple and effective with a minimum of apparatus since it is to be located in a portable equipment.

Other objects, characteristic features and attributes of the invention will be in part apparent and in part pointed out as the description of the specific embodiment of the invention progresses.

Figure 2:
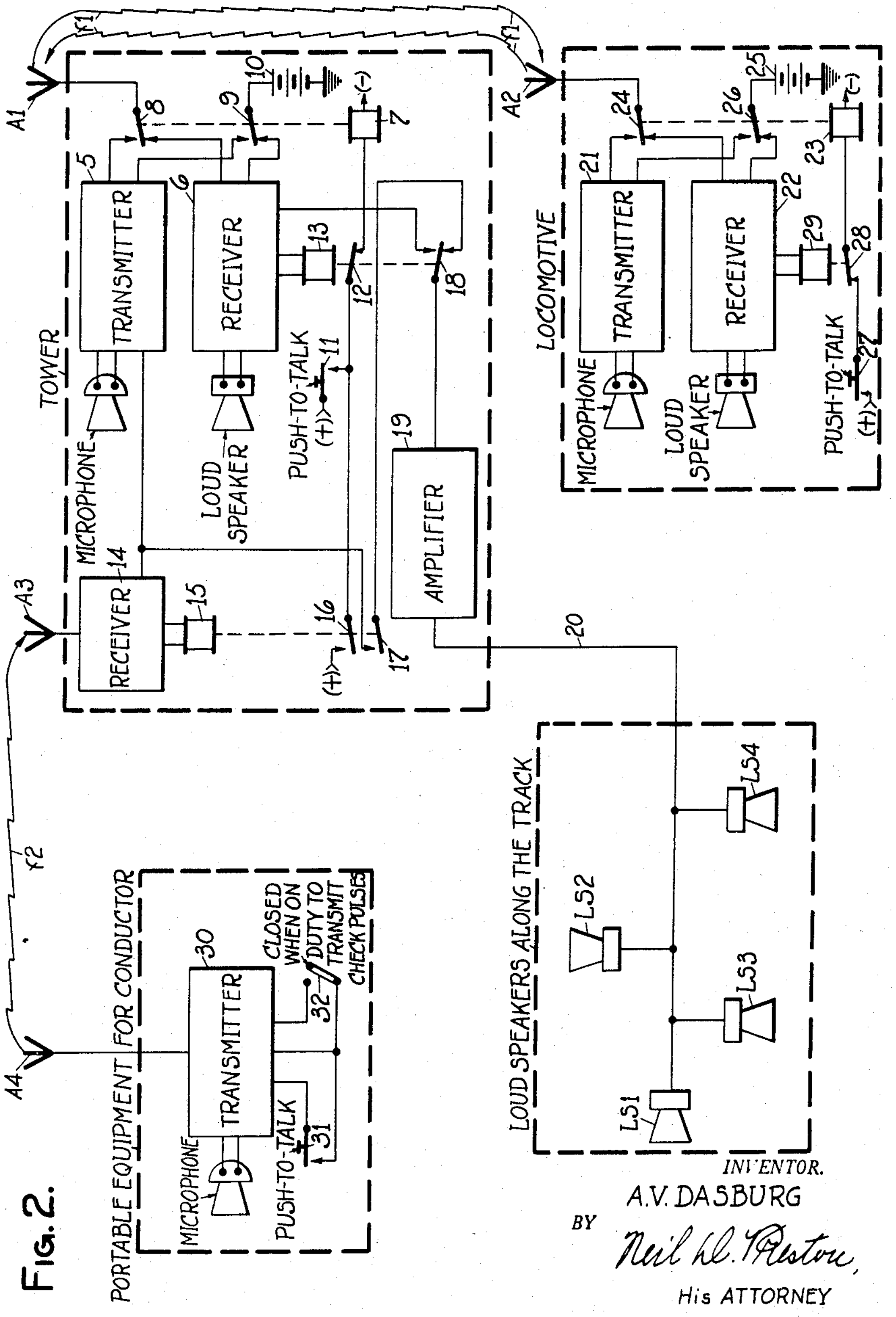
Figure 3:
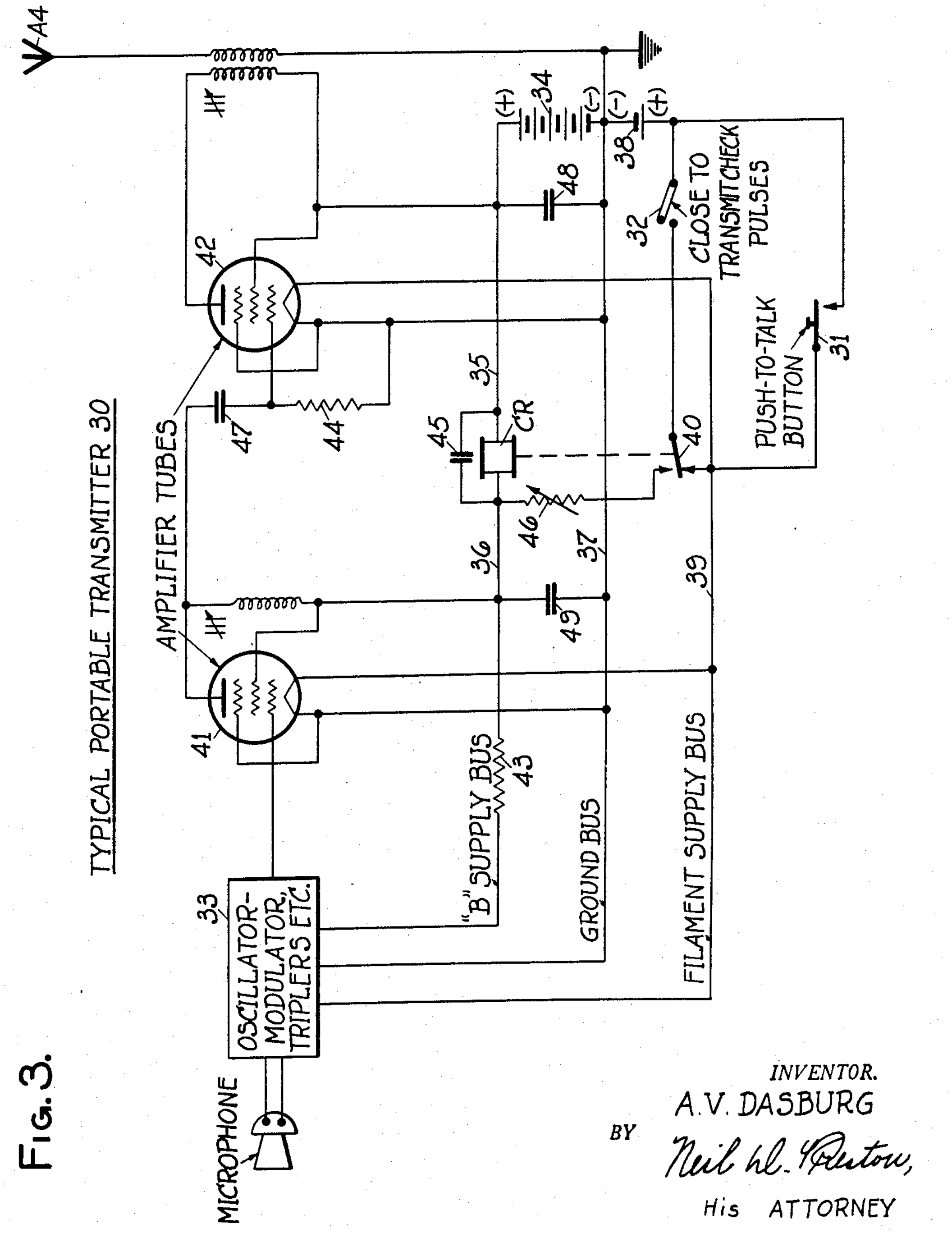

In describing the invention in detail, reference will be made to the accompanying drawings, in which like reference characters designate corresponding parts throughout the several views, and in which:

Fig. 1 is a pictorial representation of the communicating system layout for a railroad switching yard as proposed by the present invention;

Fig. 2 is a diagrammatic representation of the communication system proposed by the present invention with the parts more particularly shown in block form; and Fig. 3 is a circuit diagram of the portable transmitter constructed in accordance with the present invention to normally transmit pulses of carrier current for check purposes but manually operative to transmit a steady carrier frequency for the transmission of voice messages.

For the purpose of simplifying the illustration and facilitating in the explanation, the various parts and circuits constituting the embodiment of the invention have been shown diagrammatically and certain conventional illustrations have been employed, the drawings having been made more with the purpose in mind of making it easy to understand the principles and mode of operation, than with the idea of illustrating the specific construction and arrangement of parts that would be employed in practice. Thus, the various tubes, relays, contacts and other parts are illustrated in a conventional manner.

With reference to Fig. 1, a track layout in a switching yard is indicated as having manually operable track switches over which a train is being moved by a locomotive L. As the train moves towards the switching points, a conductor C issues instructions to the locomotive as to when to push the cars and when to stop them. At the appropriate times the conductor uncouples the cars designated for the different points and allows them to roll along the trackway over the particular route then set up by the switchmen. In order that the switchmen may know what route to set up, the instructions issued by the conductor for the locomotive are also carried over the communicating system of the present invention to the switchman via loudspeaker as diagrammatically indicated in the drawing of Fig. 1.

More specifically, a tower T has a radio transmitter and receiver with an antenna A1 so that it is able to transmit and receive messages on frequency *f*1. The locomotive L has a transmitter and receiver with an antenna A2 adapted to transmit and receive on this frequency *f*1.

In addition, the tower T has a fixed receiver with an antenna A3 adapted to receive messages over a carrier frequency of *f*2, which frequency is transmitted from the antenna A4 of the portable transmitter carried by the train conductor C. The receiver at the tower for frequency *f*2 is connected to the transmitter for transmitting the frequency *f*1 so that any messages transmitted by the conductor will also be transmitted to the locomotive. This fixed receiver for receiving frequency *f*2 from the antenna A3 is also connected to an amplifier so that any messages it may receive can be reproduced in the loudspeakers LS1, LS2, LS3 and LS4 located at strategic points along the trackway.

From this general illustration and discussion of a typical layout, it can be understood that the conductor C can issue instructions which are heard both by the operator of the locomotive and by the local switchmen along the trackway. The receiver connected to antenna A1 receiving the frequency *f*1 as transmitted from the locomotive, is also connected to the amplifier so that any messages received from the locomotive may be reproduced by the various loudspeakers along the trackway. In this way, two-way communication is established between the conductor C and the engineer of the locomotive L with the apparatus so interconnected that all such messages transmitted between them may also be heard by the switchmen.

It will also be apparent that should the communication between the conductor C and the locomotive L fail, the engineer might well continue operation of the train under dangerous conditions. In accordance with the present invention, the portable transmitter carried by the train conductor C normally operates to transmit pulses of carrier frequency which are repeated by the transmitter in the tower for the frequency *f*1 and also by the amplifier in the tower for the loudspeakers along the trackway. These intermittent pulses of carrier current turn the receivers off and on through the usual squelch equipment and in so doing produce "clicks" or "noise tails" in their respective loudspeakers. These, of course, can be heard by the engineer in the locomotive and can also be heard by the conductor C and the switchmen as reproduced by the loudspeakers along the trackway. Whenever the conductor desires to transmit a message, he actuates a push-to-talk button which causes his transmitter to apply a steady carrier frequency for an accompanying voice message. Thus, in the loudspeaker on the locomotive and in the loudspeakers along the trackway the usual clicks or noise tails are replaced by a voice message. If the noise tails cease without there being a voice message, then a failing condition is indicated and the trainmen are advised that the communication system has failed and that they should avoid any dangerous conditions.

With the above general understanding of the system organization, reference may be made to Fig. 2 where the system is indicated in greater detail in block form. The tower is shown as having transmitter 5 and a receiver 6. A microphone is directly attached to the transmitter 5 and the receiver 6 has an associated loudspeaker. In this way, a supervisor in the tower is advised of the messages received from the locomotive and may himself communicate with the locomotive. The transmitter 5 and receiver 6 are controlled by a transmit relay 7 so that the receiver is normally connected through back contacts 8 and 9 to the antenna A1 and the plate supply 10 to render the receiver normally effective to receive messages. When the operator in the tower desires to transmit, he actuates a push-to-talk button 11 which closes a circuit from (+) through a back contact of the button 11, back contact 12 of a carrier responsive relay 13, windings of transmit relay 7, to (—).

Should a message be received by the receiver 6, the reception of a carrier frequency causes the energization of the carrier responsive relay 13 and the opening of its back contact 12. This prevents any interruption of any such message by the actuation of the push-to-talk button 11.

Another receiver 14 in the tower is directly connected to its antenna A3 so as to be able to receive messages at any time over the carrier frequency *f*2. The output of this receiver 14 is directly connected to the transmitter 5. However, in order for the transmitter 5 to be rendered active, a carrier responsive relay 15 is connected to the receiver 14 so as to be energized whenever a carrier frequency is received. When such a carrier frequency is received, relay 15 closes front contact 16 to apply (+) energy to the transmit relay 7 through back contact 12. This energization of the transmit relay 7 thus causes the transmitter 5 to be conditioned for repeating any message received by the receiver 14.

Also, the picking up of the carrier responsive relay 15 closes front contact 17 to complete a circuit from the output of the receiver 14 through back contact 18 of the carrier responsive relay 13 to the amplifier 19. Thus, the messages received by the receiver 14 are repeated by the amplifier 19 over suitable cables 20 to the loudspeakers LS1, LS2, LS3 and LS4 which are located along the track as previously described.

It will also be noted that when the receiver 6 receives a carrier frequency the relay 13 is picked up preventing any interruption of its reception by opening back contact 12 and at the same time front contact 18 is closed so that the message being received by the receiver 6 is also repeated into the amplifier 19 to be reproduced by the loudspeakers LS1, LS2, etc.

The locomotive has a transmitter 21 and a receiver 22. The transmitter 21 has the usual microphone and the receiver 22 has the usual loudspeaker. The receiver 22 is normally effective by reason of the deenergized condition of the transmit relay 23 which connects the receiver 22 to the antenna A2 through back contact 24 and also to the plate supply 25 through the back contact 26. When the trainman desires to transmit, he actuates a push-to-talk button 27 to apply (+) to the transmit relay 23 through back contact 28 of the carrier responsive relay 29. This carrier responsive relay 29 is connected to the receiver 22 so as to be energized whenever a carrier frequency is being received.

The train conductor carries a portable transmitter 30 which is permanently connected to the antenna A4. This transmitter 30 has the usual microphone connected to it and has a push-to-talk button 31 which can be closed to transmit messages. There is also an additional manually operable contact 32 which is closed when the conductor is on duty to cause the transmitter to transmit check pulses of carrier frequency. The portable transmitter 30 has been shown in greater detail in Fig. 3 to which reference should be made for the discussion of its operation.

The features of the invention relating to a portable transmitter having means to effect the intermittent transmission of check pulses of carrier frequency have been shown in detail in Fig. 3 of the drawings. Although any suitable portable transmitter might be modified to embody the principles of the present invention, it is assumed for convenience in the disclosure that a portable transmitter as shown and described in the prior application of R. B. Haner, Jr., Ser. No. 167,012, filed June 9, 1950, has been constructed and modified to include the check features of the present invention. Generally speaking, such a transmitter is of the phase modulation type employing a crystal controlled combined oscillator and modulator together with several multiplying stages. The above mentioned prior case includes first and second frequency triplers, first and second frequency doublers, the last of which is the output power amplifier for the transmitter. However, it should be understood that other types of transmitters for amplitude modulation, frequency modulation or the like may be employed, if desired, by relating the check pulse transmitting apparatus to the transmitter in the same general way as disclosed in Fig. 3.

Since this transmitter is of the portable type it is to be understood that it is rather compactly built and adapted to be carried on the belt of an operator. Also, the microphone may be of the throat type or may be one which is mounted on a movable support adjacent the mouth of the operator and constructed in such a way as to include a switch that may be closed by manual actuation of the microphone into a more proper position for transmission of a voice message. In addition, the antenna A4 may be a wire leading from the case of the transmitter through the cable of the microphone connections, although a whip type antenna may be used if desired. Some of these features particularly adapting the transmitter to portable use have not been shown in detail but have been mentioned merely to indicate the general type of apparatus employed.

More specifically, referring to Fig. 3, it will be noted that the transmitter includes an oscillator, a modulator, frequency triplers, and the like, which have been indicated by block 33; whereas, the last two stages of the transmitter which may be doublers as well as amplifiers have been indicated in detail as directly connected to the oscillator and modulator.

The oscillator-modulator 33 is supplied with plate potential from a suitable source 34 which connects over a bus 35 to the right hand terminal of a check relay CR, and through this relay CR to the bus 36. The plate and screen grid of the tube 42 are connected to the bus 35; while the plate and screen grid of tube 41 are connected to the bus 36. Likewise, each of the early stages of the transmitter are also connected to the bus 36. It should be noted that each of these plate connections to the bus 36 is decoupled by a decoupling resistor such as resistor 43 included in bus 36.

The cathodes of all stages are connected to ground through a suitable bus 37 which is also connected to the negative terminals of the plate supply 34 and an "A" battery supply 38. The positive terminal of the "A" battery supply is connected to a filament supply bus 39 whenever a push-to-talk button 31 is actuated, or when the manually operated contact 32 is closed. It should be noted that this connection through the contact 32 also includes a back contact 40 of the check relay CR.

It is contemplated that subminiature tubes will be employed. It is also desirable in the interests of saving power to have these tubes constructed with filamentary type cathodes which are heated by reason of their connection between the ground bus 37 and the filament supply bus 39.

The control grid of the amplifier 41 is connected to the output of the oscillator modulator and tripler 33. The suppressor grid of this amplifier 41 is connected directly to the cathode. The plate of the amplifier 41 is connected to the control grid of the amplifier 42 through a suitable coupling capacitor 47. This plate circuit is tuned by a suitable permeability tuned inductance as indicated by the symbols. The screen grid is connected to bus 36.

The plate of the amplifier tube 42 is connected to the plate supply through a suitable permeability tuned inductance coupled with another inductance in the circuit for the antenna A4. The control grid is connected through a grid leak resistor 44 to ground. Interstage decoupling for radio frequencies is provided by capacitors such as capacitors 48 and 49. Also, a capacitor 45 is connected across the check relay CR for reasons presently to be explained. A variable resistor 46 is connected from the left hand terminal of the check relay CR to the front contact 40.

Let us now consider the operation of the portable transmitter 30 as carried by the conductor while he is on duty. As soon as the conductor goes on duty he closes the contact 32 which supplies energy from the "A" battery source 38 through back contact 40 to the filaments of the various tubes of the transmitter including the oscillator and modulator 33 and the amplifier tubes 41 and 42. When the tubes have been heated so that the oscillator is effective and the other tubes begin to pass current, the plate and screen grid current from the plate supply 34 flows through the check relay CR to energize it. While this current is flowing through relay CR, the potential drop across its windings causes the capacitor 45 to become charged. After a short interval, the armature of relay CR picks up and opens back contact 40 to remove energy from the filaments of the tubes. As soon as front contact 40 is closed, the relay CR is connected across the plate supply 34 through the variable resistor 46. Thus, a small current will flow through the relay CR in spite of the adverse polarity of the "A" battery 38; and, the resistor 46 is so adjusted that the current thus flowing through the relay is of a value less than that required to hold the relay CR in an energized or picked up position. Under these conditions the amount of current which must be furnished by the capacitor 45 to the relay CR during the desired time interval for relay CR to remain picked up is equal to the difference in the current furnished by the plate supply through resistance 46 and that value of current actually required to hold the relay picked up.

During the time that the relay CR is energized by the flow of plate current, the capacitor 45 is charged, and when this plate current ceases to flow the capacitor 45 begins to discharge through the relay CR tending to hold it up, but since some current flow is maintained through the relay by reason of the resistor 46 and front contact 40, the capacitor 45 does not have to supply the total energizing current and for this reason a relatively small capacitor will hold the relay CR picked up for a much longer period of time than would otherwise be possible.

This arrangement is particularly advantageous for portable transmitters, since a variable resistance 46 is relatively small and light in weight and makes it possible for the capacitor 45 to be rather small and light in weight. In one construction, the capacitor 45 may be of a value such as in the order of 250 mfd. The resistance 46 may be in the order of 400,000 ohms and the resistance of the check relay CR may be in the order of 2,500 ohms. Such relay also operates on about .004 ampere of current. Actually the resistance of the relay CR acts as a decoupling resistance as between the plate circuits of the two amplifier tubes 41 and 42 to replace a resistor similar to resistor 43. Although various values of resistors and relays may be employed, one suitable combination employing the values above mentioned, operated to give a release time between 4 and 5 seconds.

The opening of back contact 40 as previously mentioned, removes the energy from the filaments of the tubes and when they have cooled slightly the tubes cease to conduct allowing the check relay CR to drop away as above explained. After the elapse of the release time for the relay CR, it again closes back contact 40 to re-energize the filaments of the tubes. When the tubes have again become heated, the plate and screen grid current flow through the relay CR again causes it to pick up and another release time measuring operation is initiated. In this way, the filaments of the tubes are alternately heated and cooled and short pulses of carrier frequency are caused to be broadcast.

Referring to Fig. 2 of the drawings, it will be understood that the short pulses of carrier frequency *f*2 are received by the antenna A3 and receiver 14. For each pulse the carrier responsive relay 15 is momentarily picked up and the transmitter 5 is thus rendered momentarily effective to transmit a pulse of carrier frequency *f*1 from the antenna A1. Each such transmitted pulse of frequency *f*1 is received by the antenna A2 and repeated by the receiver 22 on the locomotive. The reception of the pulse of carrier frequency causes a "click" or "noise tail" in the loudspeaker of receiver 22 and as these successive clicks are heard by the engineman, he knows that the system is operative but that no voice message is to be received.

Each energization of the carrier responsive relay 15 in the tower closes front contact 17 so that the amplifier 19 is rendered momentarily effective which in turn produces a "click" in the loudspeakers LS1, LS2, etc. along the track. In this way, the switchmen along the track are advised that the communication system is in operation but no voice message is to be received.

When the train conductor operates the push-to-talk button 31, a shunt is completed around the back contact 40 so that the filaments of the tubes of the portable transmitter 30 are maintained steadily energized. Thus, a steady carrier frequency of *f*2 is transmitted and the conductor can transmit his message by speaking into his microphone. As soon as the conductor operates the push-to-talk button 31 and causes the cessation of the pulsing operation, the loudspeaker for the locomotive receiver and the loudspeakers along the trackway cease to give off the usual clicking sound and the trainmen are put on warning that a voice message should be received. If no voice message is received, then they are advised that the communication system is inoperative and that they must act accordingly.

Since the portable transmitter 30 is normally giving out the pulses of carrier frequency, these are causing the intermittent picking up of the transmit relay 7 (see Fig. 1) so that whenever the engineman on the locomotive wishes to transmit to the conductor and switchmen along the trackway he must transmit a carrier frequency initiated slightly before he begins to speak so that the carrier frequency *f*1 received by the receiver 6 will be effective to energize relay 13 and open back contact 12 to prevent the energization of the transmit relay 7 and thereby avoid any interruption of the message to be transmitted by the engineman. Incidentally, the opening of back contact 18 of relay 13 also disconnects the amplifier from the receiver 14 so that the message received by receiver 6 is repeated into the loudspeakers LS1, LS2, etc. without any accompanying clicks.

With this organization, the system is so interlocked that the messages may be transmitted with great facility and without interference from the normal checking operation effected by the intermittent transmission from the portable transmitter 30.

Also, it is to be noted that the portable transmitter 30 is very compact and efficient in its operation for reasons above described, especially since the checking relay CR can take the place of an interstage decoupling resistor. In addition, it can be made very slow acting by reason of the capacitor 45 being used in combination with a special stick circuit for supplying energy of a limited amount below the drop away value of the relay.

In the above discussion, it has been assumed that the portable transmitter used by the conductor is of the phase modulation type usable with any conventional phase modulation receiver since such type of equipment is adaptable for use on the frequencies currently assigned for railroad purposes by the Federal Communications Commission. However, as above mentioned, the portable transmitter might be of the frequency modulation type or of the amplitude modulation type with appropriate receiving apparatus used in the tower. Although not mentioned, the transmitting and receiving equipment in the tower and on the locomotive for providing the two-way communication may well be assumed to be of the phase modulation or frequency modulation type as now currently used for railroad purposes, but amplitude modulation might also be used if desired. The main point is that the carrier frequencies *f*1 and *f*2 must be sufficiently different as to avoid any undesirable interference between the two communication channels.

In the above description, it has been pointed out how certain of the receivers have associated therewith so-called carrier responsive relays. These carrier responsive relays are suitably connected to the amplifying apparatus of their respective receivers so as to be energized or picked up when a carrier frequency is being received regardless of whether or not a voice message accompanies such carrier. In some receivers a so-called squelch control is provided to operate a relay when a carrier is received, such as shown, for example, in the Pat. No. 2,435,010 dated January 27, 1948, and it is to be understood that such a relay might also be used for the carrier responsive relays shown in this case.

Regardless of the particular type of squelch control used in the receivers employed in the embodiment of the present invention, the cessation of the reception of a carrier signal is effective to cause a distinctive noise in the associated loudspeaker. If an electronic squelch control is employed the sound is more in the nature of a "noise tail" or squeal; whereas, if a relay squelch control is employed the receiver is abruptly rendered ineffective and the noise heard in the loudspeaker is more in the nature of a "click." In any case, it should be understood that the intermittent carrier frequency check pulses cause the distinctive noise to be generated in the receiver itself.

It should also be understood that the connection of the tower apparatus may be modified, if desired, in a manner to check the operativeness of the transmitter 5 in the tower. For example, an added receiver with a suitable antenna may be provided for receiving the messages over frequency *f*1 both when transmitted locally from the antenna A1 and when transmitted from the antenna A2 on the locomotive. This added receiver is then directly connected to the amplifier 19 so that any communication from the tower, or from the portable equipment for the conductor, or from the locomotive, will be heard over the loudspeakers along the track. When this added receiver is connected to the amplifier 19, the other connections through front contacts 17 and 18 are, of course, unnecessary. This modification of the tower apparatus is mentioned to indicate that the present invention may be modified in various ways, and yet accomplish the purposes intended. However, it should be understood that the form shown in Fig. 2 is preferable in the interests of economy in apparatus.

Having described a communication system organization for switching yards as one specific embodiment of the invention, it is desired to be understood that this form is selected to facilitate in the disclosure of this invention rather than limit the number of forms which it may assume; and, it is to be further understood that various modifications, adaptations and alterations may be added to the specific form shown to meet the requirements of practice without in any manner departing from the spirit and scope of the present invention.

What I claim is:

1. A system of communication for railroad switching yards comprising a first radio transmitter and a first radio receiver at a fixed location respectively operative to transmit and receive messages over a first carrier frequency, a mobile radio transmitter and receiver located on a movable vehicle and operative to transmit and receive messages over said first carrier frequency, a portable radio transmitter operative to transmit messages over a second carrier frequency, a second radio receiver at said fixed location operative to receive messages over said second carrier frequency and operative to cause said first transmitter to repeat messages thus received, a series of loudspeakers along the trackway of the switching yard connected to reproduce messages as received by said first and second radio receivers selectively at said fixed location, and selecting means governed by said receivers at said fixed location for selecting which of said receivers shall supply its output to said loudspeakers.

2. A system of communication for railroad switching yards comprising a fixed radio station capable of receiving on two different frequencies and capable of transmitting on a particular one of said frequencies, a mobile transmitting and receiving equipment capable of communicating with said fixed station over said particular frequency, a series of loudspeakers along the trackway connected to said fixed station to reproduce any message received by it over either frequency, a pocket transmitter constructed to normally transmit pulses of carrier current on the other of said two frequencies but manually operative to transmit a steady carrier modulated by a voice message to communicate with said fixed station, and means at said fixed station responsive to the reception of said carrier over said other frequency for retransmitting the received signal over said loudspeakers and over said transmitter at said fixed station to thereby communicate with said mobile equipment.

3. A system of radio communication for railroad switching yards comprising, a fixed radio station having a radio transmitter and radio receiver operative to transmit and receive messages over a first carrier frequency and also having a second radio receiver operative to receive messages over a second carrier frequency, both of said receivers being normally effective to receive messages and said transmitter being inactive, a series of local loudspeakers mounted along the trackway of the switching yard, circuit means normally connecting said loudspeakers to said second receiver to reproduce any messages received by it, said circuit means being governed by said first receiver for disconnecting said loudspeakers from said second receiver and connecting them to said first receiver to reproduce any messages received by such first receiver, a mobile radio transmitter and radio receiver operative to transmit and receive messages over said first carrier frequency, and a portable transmitter constructed to normally transmit pulses of carrier current of said second frequency and including means manually operable for rendering it effective to transmit a steady carrier of said second frequency modulated with a voice message, and circuit means connecting said second receiver with said first transmitter at said fixed radio station for rendering said first transmitter active and causing it to repeat any message received by said second receiver, said circuit means being controlled by said first receiver at said fixed station to render said circuit means ineffective when a carrier frequency is being received by such first receiver to thereby permit messages to be received by said first receiver and reproduced by said series of loudspeakers independent of continued operation of the transmission of carrier pulses of said second frequency by said portable transmitter.

4. A system of radio communication for railroad switching yards comprising, a fixed radio station having a transmitter operative to transmit messages over a first carrier frequency for reception by one or more mobile receiving units, a receiver at said fixed station operative to receive messages over a second carrier frequency and operatively connected to said transmitter for relaying such messages over said first carrier frequency, a series of loudspeakers located along the trackway and connected with said receiver for reproducing any messages received by it, and a portable transmitter constructed to normally transmit pulses of carrier current of said second frequency to thereby cause intermittent "noise tails" to be heard over said loudspeakers, said portable transmitter including means manually operable to cause it to transmit a steady carrier of said second carrier frequency modulated with a voice message, whereby both said check pulses and voice messages transmitted from said portable receiver can be relayed to mobile units and can be heard by the operator of said portable transmitter as he moves about adjacent said local loudspeakers giving him a check on the effectiveness of his transmission.

5. A system of radio communication for railroad switching yards comprising a fixed radio station having a transmitter operative to transmit messages on a first carrier frequency when rendered active, a radio receiver at said fixed station operative to receive messages over a second carrier frequency, circuit means connecting said receiver to said transmitter and controlled upon the reception of a carrier frequency by said receiver for rendering said transmitter effective to retransmit the messages thus received, a portable transmitter constructed to normally transmit pulses of carrier current of said second carrier frequency and including means manually operable to render it effective to transmit a steady carrier frequency modulated by a voice message, a series of local loudspeakers positioned along the trackway and connected to said receiver of said fixed radio station to reproduce the check pulses and messages received by it, and circuit means at the fixed radio station manually operable for rendering said associated radio transmitter effective to transmit messages independent of the reception of carrier frequency pulses received by the associated receiver and without interrupting the repeating of such pulses for producing "noise tails" by said local loudspeakers.

6. A system of radio communication for switching yards comprising, a fixed radio station having one radio receiver operative to receive messages on one carrier frequency, and also including a transmitter and receiver operative to transmit and receive messages on a different carrier frequency, said one receiver also being connected to said transmitter for the retransmission of any messages that it may receive, a series of local loudspeakers located along the trackway connected with said one receiver at said fixed station to reproduce any messages received by it and also connected to said other receiver at said fixed station to reproduce any messages received by it, a mobile transmitter and receiver operative to transmit and receive messages over said different carrier frequency, and a pocket transmitter constructed to normally transmit pulses of carrier current of said one frequency to thereby cause intermittent "noise tails" to be heard over said local loudspeakers along the trackway and also from said mobile receiver, said pocket transmitter being manually operative to transmit a steady carrier of said one frequency modulated with a voice message to be received by said one receiver and reproduced by said local loudspeakers along the track and also to be retransmitted for reception by said mobile receiver, whereby the failure to hear said intermittent noise tails without the presence of a voice message either along the trackway from said local loudspeakers or from said mobile receiver indicates the failure of said communication system.

7. In a radio transmitter organization including an oscillator and a plurality of stages of amplification each having plate circuits and cathode heating circuits, a relay having an energizing winding and a back contact opened upon energization of such winding, said winding being connected in series with said plate circuits, and said back contact being connected in series with said cathode heating circuits to open such circuits when said winding is energized, whereby said transmitter organization is effective to transmit pulses of carrier frequency at spaced intervals.

8. In a radio transmitter organization including an oscillator and a plurality of stages of vacuum tube amplifiers each having plate circuits supplied with energy from a common plate supply source and each having cathode heating circuits supplied with energy from another common energy source, an electromagnetic relay having an energizing winding and a back contact opened upon energization of such winding, said winding being connected in the common connection of said plate circuits to said plate supply source, and said back contact being connected in the common connection of said cathode heating circuits to said another common energy source but effective to deenergize said cathode heating circuits when said winding is energized, and a capacitor connected in multiple with the winding of said relay to be charged during the energization of such winding, whereby said transmitting organization acts to intermittently transmit pulses of carrier frequency at spaced intervals determined by the release period of said relay as prolonged by said capacitor.

9. In a radio transmitter organization including an oscillator and a plurality of stages of vacuum tube amplifiers each having plate circuits and cathode heating circuits, said circuits having their respective sources of current supply, a relay, circuit connections for said relay for supplying it with energy in series with the plate circuits of said vacuum tubes, a back contact on said relay included in series with the cathode heating circuits of said vacuum tubes to deenergize such cathode circuits when said back contact is opened, a front contact on said relay connected in a stick circuit for said relay to supply current to it which by-passes said plate circuits, said stick circuit including said sources of current and a resistor to limit the current flow in said stick circuit to a value slightly below the amount required to hold said relay picked up, and a capacitor connected in multiple with said relay, whereby said transmitter organization is operative to intermittently transmit pulses of carrier frequency at intervals determined by the release period of said relay as prolonged by said capacitor and said stick circuit with limited current flow.

10. A radio transmitter organization according to claim 9 in which a push-to-talk button is included in a circuit shunting the back contact of said relay, whereby the actuation of said button causes the cathodes of said amplifier stages to remain continuously heated to effect the continuous transmission of a carrier frequency to be modulated in accordance with a desired voice message.

11. A radio transmitter organization according to claim 9 in which the plurality of stages of vacuum tube amplifiers have their plate circuits connected to a common plate supply of energy but with each plate circuit being isolated from the others by a decoupling resistor, except in the connection between the plate circuits of the last two stages in which the said relay is connected and acts as a decoupling impedance in place of a decoupling resistor.

12. In a communication system, a central station having transmitting and receiving means associated with a first channel of communication, a first remote station having transmitting and receiving means for communicating over said first channel with said central station, a second remote station having transmitting means for transmitting over a second channel of communication to said central station, receiving means at said central station for receiving said signal from said second remote station, means at said central station governed by said receiving means of said channel for retransmitting said signal received over said second channel to said first remote station, means at both said central station and said first remote station governed by the reception of a signal by the associated receiving means for preventing the operation of the associated transmitting means, sound reproducing means having the outputs of said two receiving means at said central station selectively applied thereto, means for causing said transmitting means at said second remote station to transmit an unmodulated signal intermittently over said second channel to provide a check on the operation of said transmitting means at said second remote station through the intermittent reproduction of squelch noise tails by said sound reproducing means, whereby the initiation of transmission of a signal from either of said remote stations provides control of communications over both said channels by the transmitting station but control of said channels of communication may be obtained by said first remote station when said second remote station is transmitting its intermittent checking signal by transmitting a steady signal on the "off" periods following one of said intermittent pulses transmitted by said second remote station.

References Cited in the file of this patent

UNITED STATES PATENTS

| | | |
|---|---|---|
| 1,868,489 | Barry | July 26, 1932 |
| 1,903,420 | Badma | Apr. 11, 1933 |
| 2,053,661 | Hansell | Sept. 8, 1936 |
| 2,143,501 | Snyder | Jan. 10, 1939 |
| 2,407,417 | Halstead | Sept. 10, 1946 |
| 2,459,105 | Halstead | Jan. 11, 1949 |
| 2,462,181 | Grosselfinger | Feb. 22, 1949 |